Figure 1:
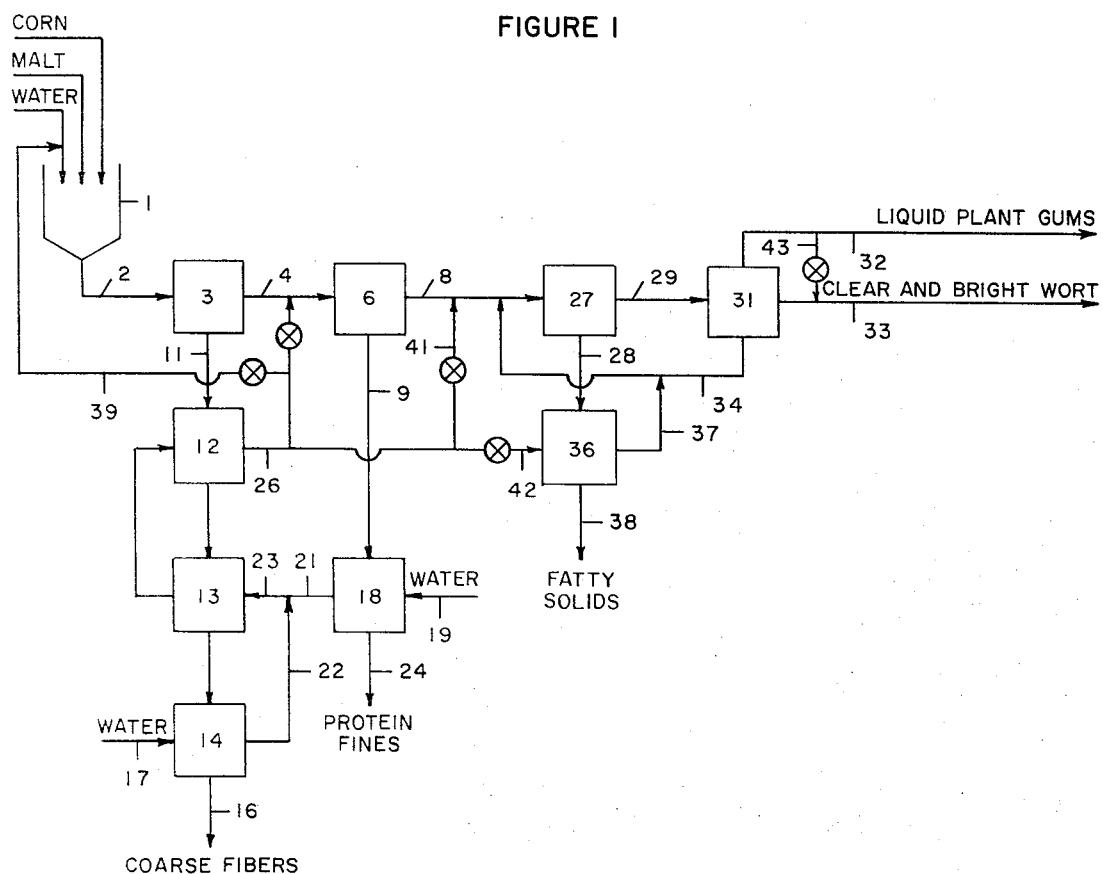

United States Patent [19]
Stiles

[11] 3,772,036
[45] Nov. 13, 1973

[54] LAUTERING PROCESS
[75] Inventor: S. Robert Stiles, Morristown, N.J.
[73] Assignee: Pullman Incorporated, Chicago, Ill.
[22] Filed: Aug. 5, 1971
[21] Appl. No.: 169,304

[52] U.S. Cl. .......................................... 426/417
[51] Int. Cl. ............................................. C12c 7/00
[58] Field of Search .............. 99/50, 51, 52, 275, 99/276, 277, 277.1

[56] References Cited
UNITED STATES PATENTS
2,726,957  12/1955  Kunz....................................... 99/51
2,847,309   8/1958  Rohrbeck ............................... 99/52

Primary Examiner—Lionel M. Shapiro
Assistant Examiner—R. B. Penland
Attorney—Clarence W. Crady et al.

[57] ABSTRACT

A lautering process for the production of clear and bright wort employing high energy separation techniques and including the step of removing a low density fatty solids fraction from partially clarified wort. The removal of excess quantities of soluble plant gums is also disclosed.

1 Claim, 2 Drawing Figures

3,772,036

INVENTOR
S. ROBERT STILES
AGENT
ATTORNEY.

LAUTERING PROCESS

The invention relates to a lautering process for the production of clear and bright wort from a partially clarified wort. One specific aspect of the invention relates to the production of wort suitable for beer production.

"Brewing" is the procedure used for the production of alcoholic beverages from various natural starchy materials through the medium of fermentative processes of yeast. The starch is first converted into sugars by enzymatic biological processes and the thus formed sugars are subsequently converted into alcohols by the action of added yeast. The term "brewing" applies to a great many overall processes for the production of alcoholic beverages, e.g., — whiskey, vodka and beers of various types are produced by brewing techniques.

The overall brewing process includes various subprocesses including those of "mashing" and "lautering." Mashing is a process in which the naturally occurring starches are converted into sugars by enzymatic action. The raw materials for this process include: (1) starchy materials, such as cereal grains or legumes including malt, barley, rye, wheat, corn, rice, potatoes, etc.; (2) enzymes (amylase) capable of converting starch into sugar, and enzymes (protase) capable of solubilizing a portion of the protein film surrounding the starch sacs of the starchy raw material, and (3) water.

The enzymes can either be produced in prior malting operations of cereal grain by known techniques, in which case at least a portion of the starchy raw material is contained by the malted grain, or artifically produced enzymes can be added directly to the starchy material, in which case no malt is required for the mashing operation.

After the mashing operation, the liquid extract, called "wort," is separated from spent fibrous material, e.g., the spent grain, in a "lautering" process. Said lautering process is conventionally carried out in two steps, in which the spent fibrous material is separated from the wort in the first step, followed by the sparging step in which occluded sugar liquor remaining in the spent fibrous material is washed therefrom by displacement or sparging with the resulting sparge liquor being combined with the wort from the first step. In addition to sugar the wort will contain various other soluble compounds extracted or produced during the mashing operation, e.g., — solubilized proteins.

The resulting clear and bright wort can be treated in various ways depending on the desired ultimate product. For instance, it can be concentrated by evaporation in which case a malt syrup is obtained. Another common use for wort is in the production of beer which includes the step of raising the temperature of the wort to the boiling point in the brew kettle in order to precipitate excess dissolved proteins prior to the fermentation step.

Lautering equipment in use today in most breweries is some form of filter press or lauter tub wherein the insoluble portion of the cereal grains remaining after mashing are separated from the brewer's extract solution or wort by a low energy slow percolation procedure. These solids form their own filter bed and extreme care is taken to prevent excessive compaction and blinding by any collodial material released from the grain structure during mashing. Particle size of milled brewer's cereal grains are closely controlled to prevent bed compaction and excessive filtration time. Milling to coarser than optimum size often results in incomplete conversion of starch, loss in yield and need to solubilize more protein than would be necessary if finer milling could be tolerated. The initial wort runoff is quite hazy and the wort is recirculated until it becomes "clear and bright."

Following each batch type run the spent grains are sparged to remove occluded sugar and the grain is dumped. These spent grains are generally suitable only for cattle food since the quantity of fibrous material is too high for non-ruminant animals to digest. Sugar recovery in conventional lautering systems range between 90–95% of the maltose sugars produced in the typical brewer's mash.

Recently alternate processes have been proposed for recovering wort including processes that employ centrifuges (see, for example, U.S. Pat. No. 1,920,461; U.S. Pat. No. 2,513,687 and U.S. Pat. No. 2,726,957). For various reasons these processes have not been adopted by the brewing industry.

During the initial periods of operation of the proposed alternate high energy processes, wort can be obtained sufficiently clear and bright to be subsequently processed into acceptable final products, e.g., — beer or malt syrup of acceptable quality can be obtained from the wort thus produced. It has been found, however, that after sufficient time has elapsed to attain steady state lautering conditions, as in continuous commercial size operations, the wort product of the lautering process will no longer be acceptable for further treatment for various reasons. These include the development of troublesome foaming in the lautering equipment and in subsequent processing equipment, and also development of an unacceptable taste of the final product, e.g., the beer or malt syrup. It has also been found that the wort at equilibrium conditions no longer will have the required clear and bright appearance. The beer industry especially has the most stringent specifications for "acceptable" beer, which specifications are largely undefined by any test other than taste panel evaluation of the beer characteristics since taste components often affect the final product in extremely minute quantities.

I have now found that it is possible to produce a clear and bright wort at steady state conditions in a process using high energy separating techniques for separating spent grain from the wort. I have further found that it is possible to produce a wort of overall acceptable quality while simultaneously achieving significantly higher lautering yields, i.e., sugar recovery, than those obtained in any other known process. In accordance with the invention the above results are accomplished by removing from a partially clarified wort, e.g., the final product of any of the previously known high energy lautering processes, a fraction comprised of fatty compounds taken from the group consisting of diglycerides, monoglycerides, fatty acid esters and free fatty acids. I have found that these compounds, having surface active properties and being normally a solid at temperature of the mash are admixed with normally liquid compounds to be selectively adsorbed on proteinaceous solids having a particle size bordering on colloidal dimensions to result in low density fatty solids mixture. The fatty solids mixture has a particle size usually in the range of 2–20 microns while the average particle size is about 9 microns. The solids differ from coarser solids previously separated within the lautering process, in both color, odor and density, i.e., the fatty solids are yellow and have a distinct odor. In view of the extremely small particle size and the high fat content which reduces the particle density to the extent that it nearly approaches the specific gravity of the wort, the removal of the above-mentioned fraction requires high G forces.

I have found that it is necessary to remove the fatty solids for flavor and quality control, particularly when the process is utilized to produce wort subsequently used in fermentation processes such as brewing of beer, ale, and other alcoholic spirits. Comparable flavor control is also essential when the wort is concentrated into syrups used by the above processors as well as by baking, confectionary, and other direct sugar consumption industries. The fatty compounds are released to some degree from the grain kernel structure during mashing to preferentially pass along with the wort to be retained within the filter bed by conventional lautering systems, but whenever grain-wort separation methods use high fluid flow velocities, turbulence, centrifugal force, pressure change or any other high energy separation procedure they preferentially remain with the wort.

The release rates of these fatty compounds are further increased when the high energy separation process is conducted in a manner so as to maximize sugar recovery therein and even moreso if it is required to simultaneously achieve separate recovery of fibrous solids as well as protein-rich solids. This is so because generally the solid fractions are required to be contracted with water in several steps including sparging and high energy separation steps to extract the occluded sugar from the solids. For obvious economical reasons the water is passed from one of said contacting steps to another to enrich the washing medium or sparge in sugar content during its passage through the various contacting zones and the resulting concentrated sparge is returned to the process at a suitable point. I have discovered that the fatty compounds are selectively released from the solids in the aforementioned contacting steps. If the fatty material is allowed to remain in the final wort product, any subsequent heat treatmnet at above about 170° F. Will result in the release of the fatty compounds from the proteinaceous solids. The fatty compounds will remain in the wort and it is believed that the objectionable taste is produced by some adverse heat sensitive reaction, e.g., hydrolysis or oxidation, or by reaction with the yeast. The tolerance limits for passage of the fatty compounds into the final wort product are extremely low, since quantities detectable by taste are values measured in parts per billion increments.

In a preferred embodiment a second lighter viscous liquid is removed in a centrifugal separation zone, said lighter fraction being comprised of soluble plant gums or mucilages suspended in the wort liquor along with any cereal oil that may have been released from brewing materials during mashing. As in the case of the fatty compounds, the release rates of the liquid plant gums are increased in high energy lautering processes and especially so when high sugar recovery is desired. The gums are preferentially released in later wort recovery stages employing treatment with relatively low specific gravity solutions such as fresh water. Although these gums when isolated from the viscous liquor are white solids that do not decompose or react adversely at temperatures above 170° F. into objectionably tasting compounds in the brew kettle or evaporator, and, in fact, impart many desirable flavors and foam characteristics of beer, I have found that, if no separation and removal of the plant gums is carried out, or if only an oil fraction is removed from the wort, severe precipitation problems occur in subsequent treatment of the wort. Specifically, in the brew kettle wherein the wort is boiled to precipitate excess dissolved proteins, the viscous mucilages adhere to the precipitated proteins to form gum balls. As mentioned above, in moderate quantities the viscous liquid plant gums help to create the head and the characteristic flavor of beer. Thus, when the invention is incorporated in a beer process, only a controlled amount of the viscous liquid plant gum should be withdrawn from the process, the minimum amount being such that no "ball up" problems are encountered in subsequent treatment of the wort. The maximum amount to be withdrawn will vary from one brewer to another in order to meet the requirements as to taste and foaming characteristics. This fraction contains essentially all of the cereal oils, a portion of which may be desired in the product wort. A convenient method of controlling the quality of the final wort product, is to withdraw a fraction which is somewhat larger than required and blend back portions thereof into the wort until the desired quality is achieved. The recycle can be of the same composition as that of the aforementioned viscous liquid plant gum fraction. It can also be the oil phase separated from said fraction or an oil-enriched portion thereof. A three fraction centrifugal separator for this step can be employed to provide also for the further recovery of any fatty solids not separated out in the previous separation. These solids are suitable recycled to the zone for separating out the bulk of the fatty solids for the purpose of maintaining stable operating conditions and to minimize loss of wort from the system. Alternately, the remaining fatty solids can be recovered in a separate centrifuge. In case of operational problems due to recycle buildup of particles of small diameter sizes these remaining solids may be rejected as a product.

The method and centrifugal equipment used for separation and removal of the fatty solids and the viscous liquid fractions from wort depend on the characteristics of the wort being processed.

The lighter gum fraction being lighter than mash worts and most clarified worts used in brewing, will separate along with any lighter liquid phase withdrawn from the wort. However, it is water soluble and stays in the water phase to impart high viscosity conditions to the liquid when the total quantity of lighter liquid withdrawn becomes small. In the extreme case where the quantity of light liquid withdrawn equals the quantity of free oil present, this gum will stay with the water phase and not mix into the oil. As the light liquid withdrawal quantity increases a high viscosity aqueous emulsion phase is removed along with the oil. Viscosity of the aqueous phase of the stream will indicate the quantity of these gums being withdrawn.

Generally disc type centrifuges are used for this separation because of their high separation efficiency. However, any bowl type where liquids and/or solids can be collected at inner and outer radii and removed from these two zones either continuously or on intermittant basis may be used. Several manufacturers market angled disc type centrifuges. One operating at 6,000 RPM with disc stack diameter ranging 4 inches at inner and 10 inches at outer radii will perform satisfactorily.

Separation of the heavier fatty solids fraction from the wort are more difficult to perform. Having density approximately equivalent to 18° Balling wort and particle size approaching colloidal dimensions its separation depends on the wort stream characteristics. At 18° Balling its separation by centrifugal force is essentially impossible. As the wort density varies above or below this value separation from wort will become precipitably easier at finite residence times while passing between angled centrifuging discs or along a rotating cylinder at high G forces. When the wort is lighter than the fatty solids, separation will be accomplished by collecting these solids at the outer periphery of the rotating bowl or cylinder.

Centrifuge equipment for the initial separation must provide sufficient residence time under adequate "G" force to accomplish at least substantial removal of the yellow fatty solids from the wort. Disc centrifuges operated at relatively low throughput rates function best to perform this separation. The solids are discharged from the bowl periphery either as intermittant dislodging operation or as thickened stream jetting continuously through nozzles in the bowl outer edge. Economics dictate that these solids be discharged as thick paste with minimum of occluded wort. For efficient and satisfactory solids removal I have found it necessary to conduct the centrifugal separation at a clarification factor of at least about 35 and preferably above 40. The condition of the disc surface affects this separation such that clean highly polished surfaces produce good results at lower factor values. The clarification factor is defined as the ratio of the Westfalia capacity factor to the feed throughput rate, expressed in gallons per hour. The Westfalia capacity factor is well known in the art and its definition can be found in various publications, e.g., in the section entitled "Technical Corner" of the publication "Centri-facts," Centrico, October, 1964.

When the wort is heavier than the fatty solids they will float along with the lighter gums and oil to separate on the inner radii of the centrifuge and be removed as a combined light stream. Theoretically no solids will collect in the bowl periphery. In practice a disc centrifuge capable of dislodging solids from the bowl periphery would be used to provide for the discharge of traces of some heavier solids of 2–5 microns particle size that pass forward to this machine from upstream equipment. The combined light stream is subsequently diluted to reduce the density of the wort entrained therein, and the resulting dilute mixture is separated into a liquid viscous gum fraction, a fatty solid fraction and a clear and bright dilute wort fraction by means of the separation techniques discussed above in connection with processing of worts having densities below 18° Balling. The clear and bright dilute wort is generally blended back into the concentrated wort obtained from the first centrifugal separation step. In this embodiment of the invention it is possible to obtain as a final product of the lautering process a concentrated wort meeting all of the above-mentioned quality requirements without resorting to intermediate major dilution and concentration steps.

The fatty solids fraction obtained from any one of the above described embodiments of the invention can be further treated in a sparging-centrifugal zone for recovery of wort entrained in the solids.

In those cases where it is desired to recycle some of the fatty solids to the system, e.g., to maximize wort recovery, I have found that the selection of the point of reintroduction of these fatty solids is of great importance in order to avoid various operating problems such as foaming, etc. Thus, the recycle solids should be returned to the centrifuges serving to separate such solids from partially clarified wort. However, severe operational problems will occur if they are returned to any of the stages within the process serving to recover wort from other solids by sparging operations, since due to their low density relative to those of the other solid fractions separated out in earlier stages, they will selectively pass along with the wort and sparging liquors, causing foaming and operational upsets in all equipment in the path of these streams.

There are many advantages to the process of the present invention: For instance, since particle size of the raw materials is of minor importance in the present process and does not affect solids-liquid separation efficiency as is the case in conventional processes, it is possible to employ any desired particle size distribution that will maximize conversion of starch to sugar often defined as conversion yields. Also, the time required for treating the effluent from the mash to obtain a clear and bright final wort product is considerably shorter than in conventional processes. In addition, it is possible to achieve much higher lautering yields than in conventional processes, the lautering yield being defined as the amount of extract, i.e., sugar and soluble protein, present in the final wort product expressed as a percentage of the extract produced in the meshing operation. Lautering yields in conventional processes are usually below 95%, typically in the range from 90 to 95%, while the present process permits a sugar recovery well in excess of 95%, e.g., about 98% or better. Still a further advantage of the present process is the recovery of additional salable products of higher unit value than heretofore possible. In the past the solids fractions recovered from conventional lautering processes, have been dried and sold as cattle feed and/or blended with cereal, fish and meat meal for chicken feed, since the solids contain considerable quantity of indigestible fibers along with various amounts of nutrients, such as proteins and fat.

The present process, however, permits the separation of spent grains into fibrous, proteinaceous and fat fractions which can subsequently be marketed directly or subjected to further treatment for the economic recovery of protein, fatty compounds such as various glycerides and free fatty acids or esters thereof, and of plant gums and mucilages.

In order to provide a better understanding of the invention, reference is made to the accompanying drawings which schematically show two separate embodiments of the invention.

In FIG. 1 the process of the invention is incorporated in a process particularly useful in the processing of relatively dilute wort, i.e., — a wort having less than 18° Balling concentration.

Figure 2:
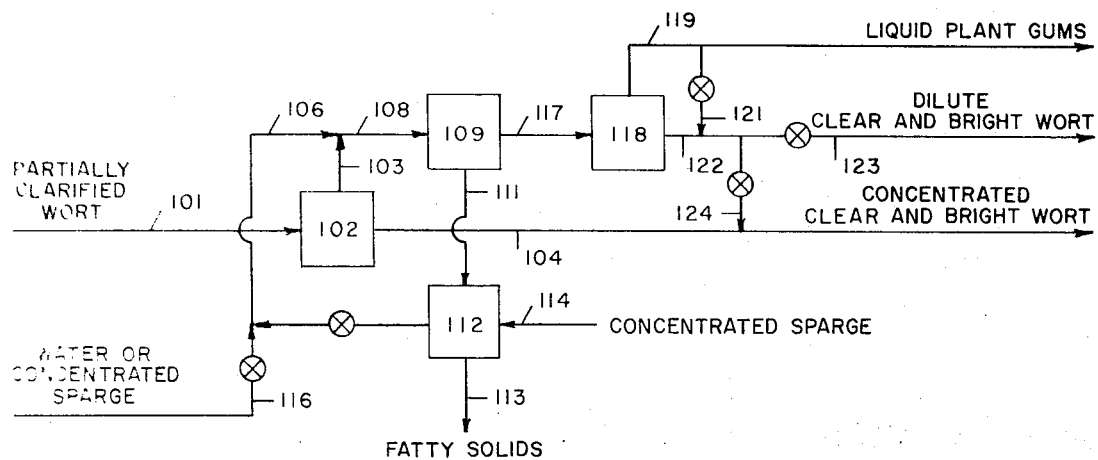

FIG. 2 shows a process for the treatment of relatively concentrated wort, i.e., — having a concentration in excess of about 18° Balling.

Referring now to FIG. 1, after mashing a mixture of corn, malt, and water in mash tub 1, the effluent is passed in line 2 to a centrifugal separation zone 3 to remove from the mash coarse fiber solids having an average particle size larger than about 100 microns. The solids depleted mash is passed in line 4 to centrifugal separation zone 6 from which a partially clarified wort is withdrawn in line 8 and a high density protein rich solids fraction having a particle size ranging between 2–150 microns is removed by line 9. The fibrous solids in line 11 removed from separation zone 3 are treated in three consecutive sparging-separation zones 12, 13 and 14 to recover occluded sugars therefrom and the solids are withdrawn from the process in line 16. Fresh water from line 17 is passed to zone 14 as sparging liquor and then countercurrently to the flow of solids through zones 13 and 12, whereby the sugar concentration of the sparging liquor is increased. Similarly, the protein rich solids 9 from separation zone 6 are treated for sugar recovery in a sparging separation zone 18 with water entering in line 19. The sparge 21 from zone 18 is combined with that from zone 14 in line 22 and passed as a combined sparging liquor stream 23 through zone 13. Sugar depleted low-fat protein fines are withdrawn from the process in line 24. The concentrated sparge 26 resulting from the various sparging separation steps is combined in this embodiment with stream 4 prior to its introduction into separation zone 6. However, other alternative points of introduction of the concentrated sparge are also feasible, e.g., to the mash tube via line 39 or to the partially clarified wort 8 after separation in zone 6 via line 41. The partially clarified wort is passed to centrifugal separation zone 27 operated at a clarification factor of above about 35 for removal of a fatty solids fraction 28 having a fat content of at least 10 weight per cent on a moisture and extract free basis. The solids depleted wort 29 is passed to one or more centrifugal separation zones 31 (only one shown) wherein are obtained a viscous liquid plant gum product 32, a clear and bright wort product 33, and a small residual fatty solids fraction 34, which latter fraction is recycled to separation zone 27. The solids 28 can be withdrawn from the process after separation in zone 27 or, if desired, treated for sugar recovery in centrifugal sparging-separation zone 36 with, e.g., at least a portion of concentrated sparge stream 26 introduced in line 42. The sparging liquor 37 from zone 36 is then passed to zone 27 and the sugar depleted solids are withdrawn from the process in line 38. A portion of the liquid plant gums withdrawn from zone 31 can, if desired, be blended with the clear and bright wort product for flavor control.

In a case where it is desired to obtain a wort product of relatively high sugar concentration, i.e., in excess of 18° Balling, preferably above 20° Balling, the partially clarified wort can be obtained, for instance, in the series of operating steps necessary for the production of wort 8 in the processing scheme depicted in FIG. 1 with the dilute wort 26 being returned to mash tub 1. However, the final steps of the process will have to be conducted in a different manner, e.g., — by the processing scheme depicted in FIG. 2. Partially clarified wort 101 equivalent to line 8 obtained from step 6 of FIG. 1 is passed to one or more centrifugal separation zones 102 (only one shown), employed to obtain a relatively light fraction 103 comprising liquid plant mucilage and fatty solids, and a relatively heavy fraction 104 of concentrated clear and bright wort product. The light fraction 103 is diluted with water or concentrated sparge 106 obtained in one or more previous steps for sugar recovery and the combined stream 108 is treated in one or more centrifugal separation zones 109 to separate out a fatty solids fraction 111 which can be treated in sparging — separation zone 112 for sugar recovery before it is removed from the process as a product in line 113. The sparging medium for zone 112 enters in line 114. If zone 112 is omitted the water or concentrated sparge 106 is obtained from conduit 116. The solids depleted dilute wort from zone 109 is passed via line 117 to centrifugal separation zone 118 where a viscous liquid fraction 119 is withdrawn, a portion of which may be recycled in line 121. A dilute clear and bright wort product is recovered in line 122. The dilute wort can be recovered as a separate product 123 or be blended with the concentrated product 104 by means of conduit 124.

A production run was made to produce clear and bright wort in a brewery having a capacity of approximately 2 million barrels per year in accordance with the embodiment of the invention depicted in FIG. 1. All data given in this example are on a basis of processing 450 barrel meshes to produce 900 barrels of finished wort product having a concentration of 11.7° Balling. A mash was prepared by treatment of 22,700 lbs. of milled malt, 14,100 lbs. of corn grit with 93,000 lbs. of water under mashing conditions. The particle size distributions of the malt and corn are given in Table I below. 36,500 lbs. of water was added in line 17 as sparging and mashing medium in zones 12, 13 and 14, and 103,025 lbs. of water was added in line 19 as sparge to zone 18. A coarse fiber product amounting to 16,540 lbs. of a protein-rich fines product was withdrawn in line 16, while 6,700 lbs. of a protein-rich fines product was recovered in line 24 and 1,821 lbs. of fatty solids in line 38. The particle size distributions of the aforementioned products are also shown in Table I.

TABLE I

Particle Size Distributions

| % larger than— microns | Malt | Corn Grit | Coarse Fiber | Protein Fines | Fatty Solids |
|---|---|---|---|---|---|
| 10% | 1800 | 1200 | 1200 | 85 | 15 |
| 30% | 1500 | 1000 | 700 | 28 | 11 |
| 50% | 1250 | 900 | 530 | 17 | 9 |
| 70% | 1020 | 800 | 380 | 12 | 7.3 |
| 90% | 500 | 670 | 240 | 5.0 | 5.4 |
| 99.5% | 100 | 500 | 100 | 4.2 | 3.3 |

In addition to the above-mentioned products, 244,210 lbs. of clear and bright wort was withdrawn in line 33 and a liquid plant mucilage product fraction amounting to 54 lbs. was recovered in line 32. Analyses of the clear and bright wort product showed that of the 28,850 lbs. of extract present in the mash, 28,577 lbs. was recovered in the wort amounting to a lautering yield of 99.1 weight per cent. Further analyses of the solid products showed that the coarse fiber product contained approximately 23.2 weight per cent protein, 21.4 per cent fiber and 6.0 per cent fat, while the protein fines contained about 57.5 per cent protein, 6.6 per cent fiber and 8.9 per cent fat (all percentages on a moisture and extract free basis). On the same basis the fatty solids contained about 24 per cent fat, 53.5 per cent protein and 1.4 per cent fibers. After treatment with methanol to extract the fatty compounds and subsequent treatment with acetone to precipitate some minor amounts of phospholipides, liquid phase chromatography on silicic acid showed that the fatty material contained considerable quantities of monoglycerides, diglyceride isomers and free fatty acids. In addition, the sample showed presence of both saturated and unsaturated fatty acid esters.

Various alterations and modifications of the process of this invention may become apparent to those skilled in the art without departing from the scope of the invention.

Having thus described my invention, I claim:

1. A process for the production of clear and bright wort comprising:
   a. preparing a clarified wort having a density above about 18° Balling;
   b. passing said clarified wort to a first centrifugal separation zone containing at least one centrifuge;
   c. centrifugally separating a fraction comprised of liquid viscous plant gums, wort and fatty material taken from the group consisting of diglycerides, monoglycerides, free fatty acids and fatty acid esters;
   d. recovering a concentrated clear and bright wort from said first centrifugal separation zone;
   e. adding water to said fraction of step c. to dilute the wort contained therein to a density below about 18° Balling;
   f. passing the water diluted fraction to a second centrifugal separation zone containing at least one centrifuge;
   g. separating in said second centrifugal separation zone a solids fraction comprised of fatty material taken from the group consisting of diglycerides, monoglycerides, free fatty acids and fatty acid esters;
   h. separating in said second centrifugal separation zone a viscous liquid fraction comprised of plant gums; and
   i. recovering a dilute clear and bright wort from said second centrifugal separation zone.

* * * * *